(12) United States Patent
Shinohira et al.

(10) Patent No.: US 7,387,530 B2
(45) Date of Patent: Jun. 17, 2008

(54) WATERPROOF TERMINAL BLOCK UNIT WITH INSULATING PLATE

(75) Inventors: Daisuke Shinohira, Kanagawa (JP); Dotaru Usui, Kanagawa (JP); Hidehiko Mori, Tokyo (JP); Yasushi Koyanagawa, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/576,072

(22) PCT Filed: Oct. 15, 2004

(86) PCT No.: PCT/JP2004/015217

§ 371 (c)(1),
(2), (4) Date: Jan. 10, 2007

(87) PCT Pub. No.: WO2005/038991

PCT Pub. Date: Apr. 28, 2005

(65) Prior Publication Data

US 2007/0155200 A1    Jul. 5, 2007

(30) Foreign Application Priority Data

Oct. 17, 2003    (JP)    ............................. 2003-358127

(51) Int. Cl.
*H01R 13/52*    (2006.01)

(52) U.S. Cl. .................................................. 439/519

(58) Field of Classification Search ................ 439/519, 439/271, 272, 274, 275, 276

See application file for complete search history.

(56) References Cited

U.S. PATENT DOCUMENTS

| | | | | |
|---|---|---|---|---|
| 3,271,726 A | * | 9/1966 | Pfendler | .................... 439/76.1 |
| 4,875,870 A | * | 10/1989 | Hardy et al. | ................. 439/204 |
| 5,604,976 A | * | 2/1997 | Stobie et al. | .................. 29/825 |
| 6,349,025 B1 | * | 2/2002 | Fraley et al. | ............... 361/302 |
| 7,012,191 B1 | * | 3/2006 | Watanabe et al. | ............. 174/50 |
| 7,056,137 B1 | * | 6/2006 | Vall Gendre et al. | ........ 439/271 |
| 7,174,633 B2 | * | 2/2007 | Onuma | ......................... 29/854 |
| 2006/0240710 A1 | * | 10/2006 | Kato et al. | ................... 439/587 |

FOREIGN PATENT DOCUMENTS

| | | |
|---|---|---|
| JP | 1-17736 | 5/1989 |
| JP | 2000-208175 | 7/2000 |
| JP | 2001-275337 | 10/2001 |
| JP | 2001-326002 A | 11/2001 |

\* cited by examiner

*Primary Examiner*—Chandrika Prasad
(74) *Attorney, Agent, or Firm*—Arent Fox LLP

(57) ABSTRACT

A terminal table unit includes: a terminal table (10) having a metal terminal (12) at its lower surface for connecting a lead wire (60); an insulation plate (20) adhered to the lower surface of the terminal table and having a hole (20-1) at a portion corresponding to the portion containing a metal terminal and its surrounding region; and a metal plate (30) having an upper surface adhered to the lower surface of the insulation plate and having a through hole (30-2) reaching from the upper surface to the lower surface. Through the through hole (30-2), the lead wire is brought out to the lower surface of the metal plate. The terminal unit has a contact surface between the insulation plate containing the hole (20-1) and the terminal table, a contact surface between the insulation plate and the metal plate, and the through hole (30-2) which are filled with adhesive and unified by a bolt (40).

12 Claims, 9 Drawing Sheets

WATERPROOF TERMINAL BLOCK UNIT WITH INSULATING PLATE

CROSS-REFERENCE TO RELATED APPLICATION

This application is a National Stage entry of International Application No. PCT/JP2004/015217, filed Oct. 15, 2004. The disclosure of the prior application is hereby incorporated herein in its entirety by reference.

TECHNICAL FIELD

This invention relates to a terminal block unit having waterproof function and, in particular, relates to a waterproof terminal block unit suitable for a terminal block having one or more terminals for electrical connection between a coil and an external circuit in a cooling-type linear motor.

BACKGROUND ART

In semiconductor manufacturing apparatuses and liquid crystal manufacturing apparatuses, demand for linear motors has been increasing as driving sources of positioning apparatuses adapted to carry out positioning of works loaded thereon. However, a coil is essential to the linear motor and it cannot be avoided that the coil acts as a heat generation source. Accordingly, a cooling structure for the coil is essential to the linear motor for use in an apparatus that requires strict temperature control, such as, for example, a stepper. The linear motor having the coil cooling structure is called a cooling-type linear motor and disclosed, for example, in Japanese Unexamined Patent Application Publication (JP-A) No. 2001-275337.

Generally, cooling-type linear motors are often of the type that covers a coil with a casing of metal, resin, or the like so as to define a space around the coil and cools the coil by feeding a coolant to the inside of the casing. The casing is attached with a terminal block having one or more terminals for connection between the inner coil and an external circuit. Issues to be solved in the linear motor of such a type are how to seal the terminal block, how to improve its maintenance, and how to attach it at a low cost.

Description will be made about first to third examples of terminal block structures in conventional cooling-type linear motors. In any of the first to third examples, the main part of a terminal block except terminals is made of an insulating resin material.

The first example uses a commercial terminal block 100 as shown in FIG. 1. The terminal block 100 is provided at its upper portion with a plurality of terminals 110 for external connection and at its lower portion with a plurality of metal terminals 111 connected to the terminals 110. Terminals 113 are connected to the metal terminals 111. This is because the length of the metal terminal 111 of the commercial terminal block 100 is short. The terminal block 100 is fixed to a casing 200 of the linear motor through a non-illustrated board or adhesive resin material. The casing 200 is formed with through-holes 201 for passing the terminals 113 therethrough. Passing portions of the terminals 113 in the casing 200 are sealed with seal portions 210 using glass, epoxy resin, or the like. Such a seal structure is called a hermetic type. Each terminal 113 is provided, at its portion corresponding to the seal portion 210, with a slip-off preventing portion 112 having an increased diameter. In the casing 200, the terminals 113 or lead wires connected thereto are connected to a non-illustrated coil of the linear motor.

The second example shown in FIG. 2 also uses, like in FIG. 1, a commercial terminal block 100 having terminals 110 and metal terminals 111. The terminal block 100 is fixed to a casing 200 of the linear motor through an adhesive resin material (not shown) or an O-ring 120. In the case of using the O-ring 120, the casing 200 is formed with an annular groove 202 for receiving the O-ring 120 therein. The metal terminals 111 are connected to lead wires 121, while the lead wires 121 are connected to coil-side lead wires 220 brought out from the casing 200. The lead wires 121 and the coil-side lead wires 220 pass through through-holes 201 so as to be received in the casing. In the case of using the O-ring 120, the terminal block 100 is attached to the casing 200 by the use of a plurality of bolts 130.

The third example shown in FIG. 3 also uses, like in FIG. 1, a commercial terminal block 100 having terminals 110 and metal terminals 111. The third example has a structure where a plate 150 made of a metal material is interposed between the terminal block 100 and the casing 200 in the second example. The plate 150 has through-holes (not shown) for passing lead wires 121 therethrough. Adhesive is used for bonding between a lower surface of the terminal block 100 and the plate 150, while an O-ring 120 is used for sealing between the plate 150 and the casing 200. The terminal block 100 is, along with the plate 150, fixed to the casing 200 by the use of a plurality of bolts 130.

In the case of the foregoing first example, the secure sealing can be expected since the hermetic-type seal structure is employed. However, the hermetic-type seal structure is high in cost. Further, the terminal block 100 is difficult to detach once it has been fixed and, therefore, there is a problem in its maintenance.

In the second and third examples, there is a merit that the structure itself is simple, resulting in low cost. However, in the case of using the O-ring 120 in the second example, a coolant in the casing 200 may leak from the terminal block 100 itself. This is caused by incompleteness of the sealing performance of the terminal block 100 itself. Even in the case of using the adhesive in the second example, there is a problem that the sufficient sealing performance cannot be obtained due to thinness of an adhesive layer (smallness in bonding area).

Further, any of the first to third examples has a problem that reliability is very low in terms of electrical insulation. In addition, the resin terminal block and the metal largely differ in linear expansion coefficient. In the seal structure between those having different linear expansion coefficients, there is a problem that the sealing performance is degraded due to thermal deformation.

Therefore, it is an object of this invention to provide a waterproof terminal block unit having high electrical insulation performance.

DISCLOSURE OF THE INVENTION

Problem to be Solved by the Invention

It is another object of this invention to provide a waterproof terminal block unit having high sealing performance.

It is still another object of this invention to provide a waterproof terminal block unit that is excellent in maintenance.

Means for Solving the Problem

A waterproof terminal block unit according to this invention comprises a terminal block having one surface provided with one or more terminals for connecting a lead member, an insulating plate attached to the one surface of the terminal block and having a first through-hole at a portion corresponding to a portion including the one or more terminals and its surrounding region, the first through-hole reaching from a surface contacting the one surface to an opposite surface, and a metal plate attached to the opposite surface of the insulating plate and having one or more second throughholes at a portion corresponding to the one or more terminals, the one or more second-through-holes reaching from a surface contacting the insulating plate to an opposite surface. The lead member is brought out to a side of the opposite surface of the metal plate through the first and second through-holes, The first and second through-holes are sealed by adhesive filled therein.

In a waterproof terminal block unit according to one mode of this invention, it is preferable that the adhesive be also interposed between the terminal block and the insulating plate and between the insulating plate and the metal plate.

In a waterproof terminal block unit according to one mode of this invention, it is preferable that a projecting portion be provided on the side of the opposite surface of the metal plate and have a communication hole continuous with the second through-hole, and the adhesive be also filled in the communication hole of the projecting portion.

In a waterproof terminal block unit according to one mode of this invention, it is preferable that a plurality of bolts be provided for. integrating the terminal block, the insulating plate, and the metal plate.

In a waterproof terminal block unit according to one mode of this invention, it is preferable that a main part of the terminal block except the one or more terminals be made of a resin and the insulating plate be made of a material having a linear expansion coefficient between a linear expansion coefficient of the terminal block and a linear expansion coefficient of the metal plate.

A waterproof terminal block unit according to one mode of this invention is adapted to be attached to a casing having a coil therein and configured to cool the coil by a coolant, to thereby carry out electrical connection between the coil and an external circuit outside the casing and is detachably attached to the casing through a sealing interposed between the opposite surface of the metal plate and the casing.

BEST MODE FOR CARRYING OUT THE INVENTION

Figure 4:
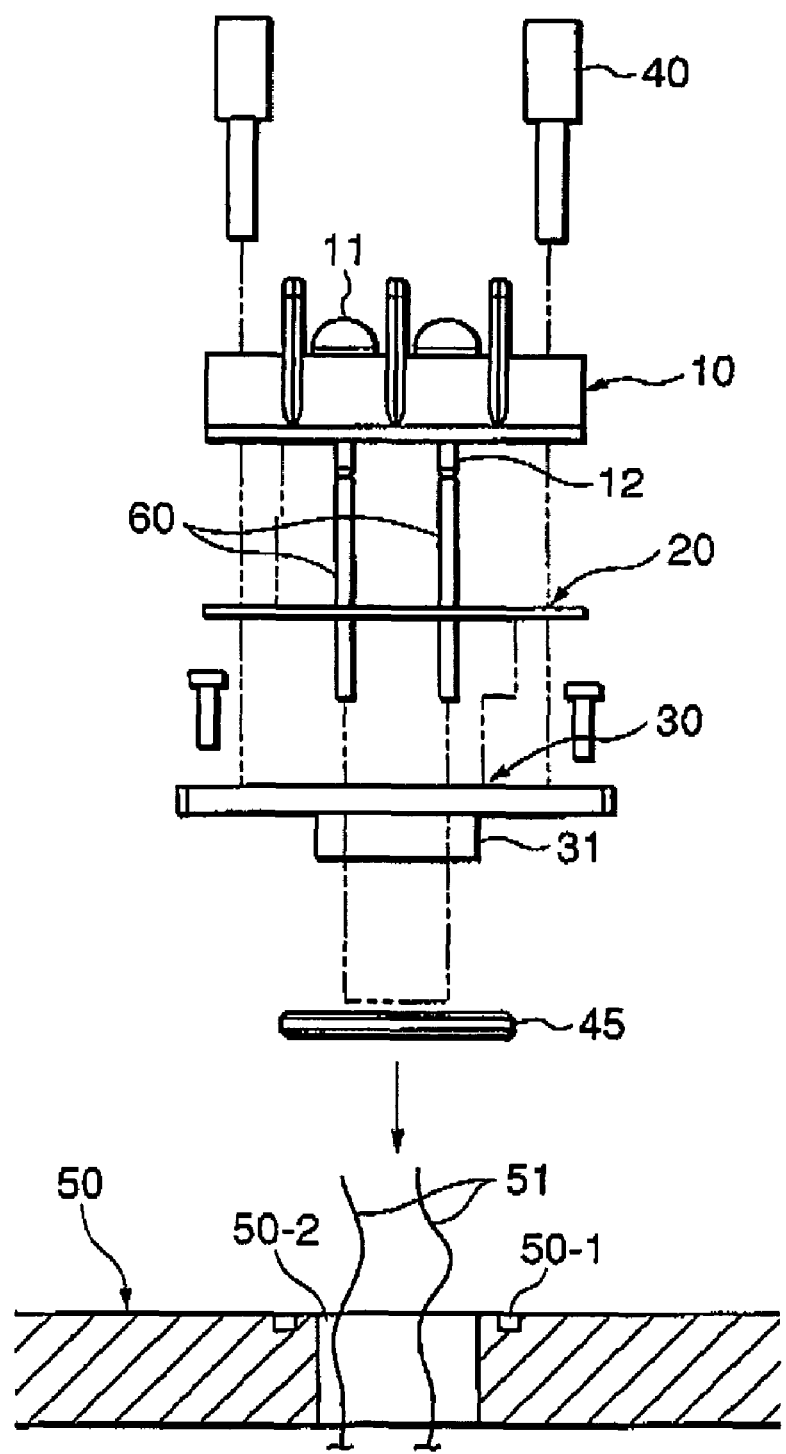
FIG. 4 is a diagram showing, in an exploded fashion, a waterproof terminal block unit according to a preferred embodiment of this invention and further showing part of a casing of a linear motor where the waterproof terminal block unit is installed.

Referring to FIGS. 4 to 8, description will be made about a preferred embodiment of a waterproof terminal block unit according to this invention. FIG. 4 is an exploded view of the waterproof terminal block unit according to the preferred embodiment. The waterproof terminal block unit includes a terminal block 10, an insulating plate 20, and a metal plate 30.

Figure 1:
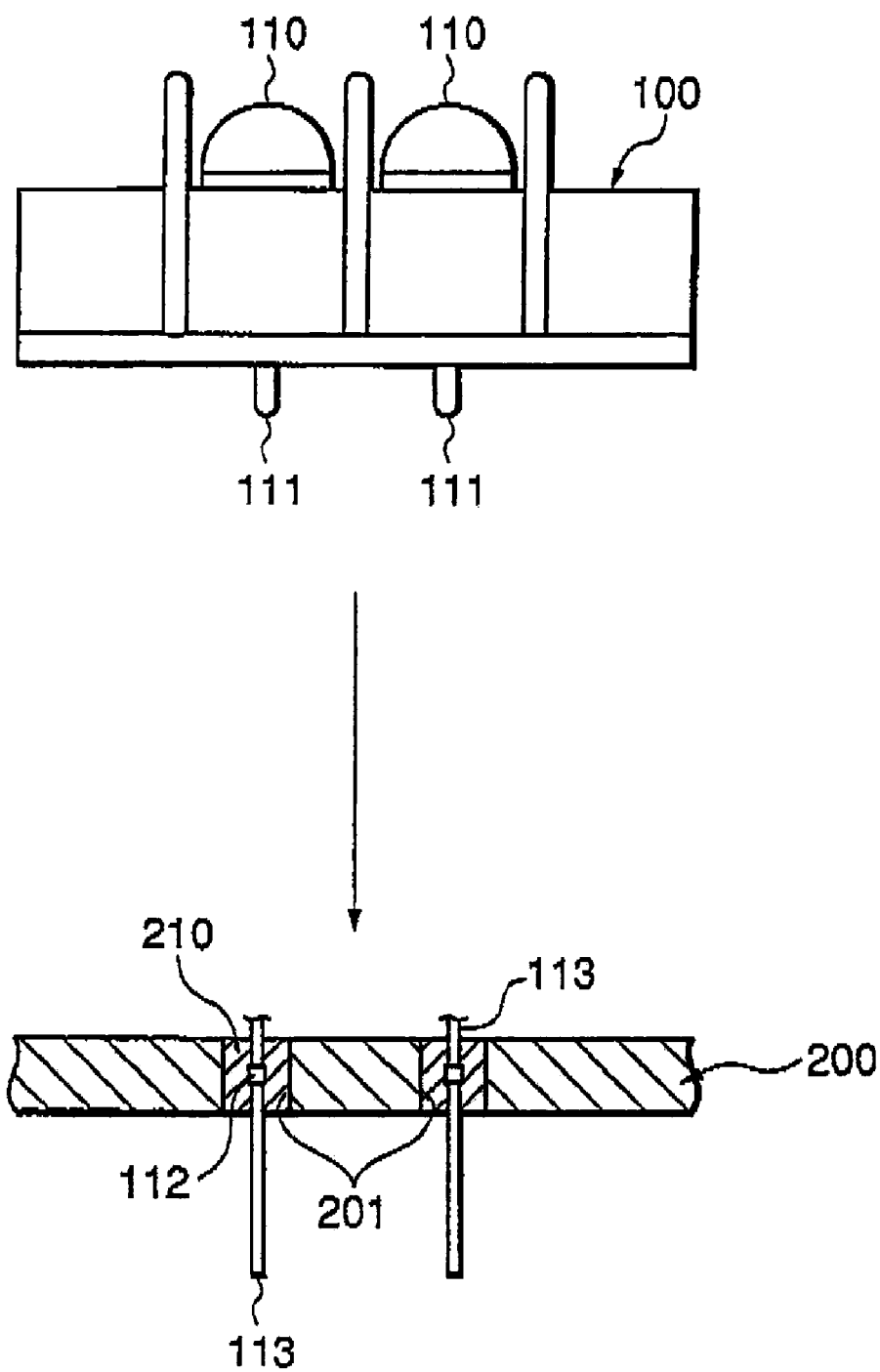
FIG. 1 is a diagram for explaining a first example of a terminal block structure in a conventional cooling-type linear motor.
Figure 2:
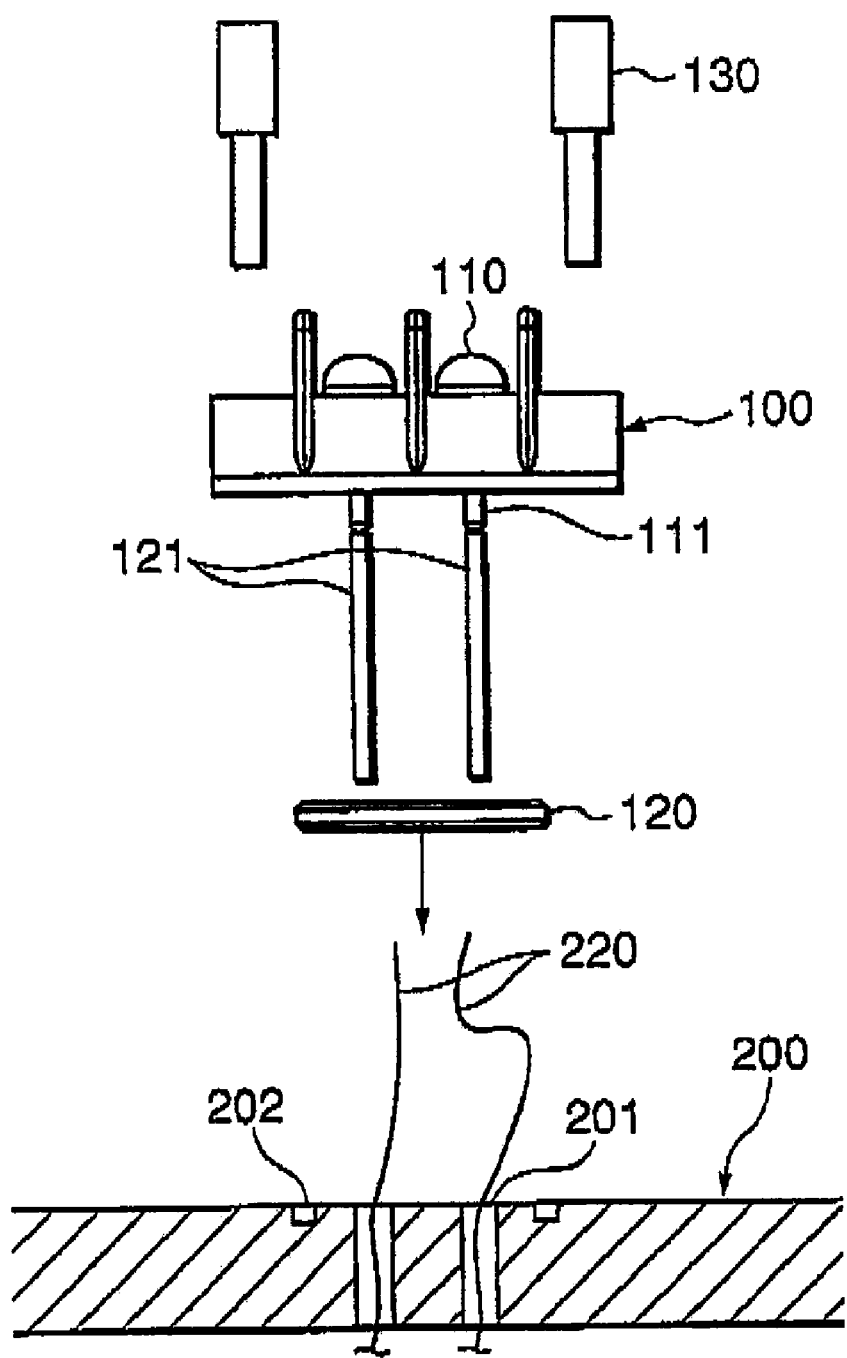
FIG. 2 is a diagram for explaining a second example of a terminal block structure in a conventional cooling-type linear motor.
Figure 3:
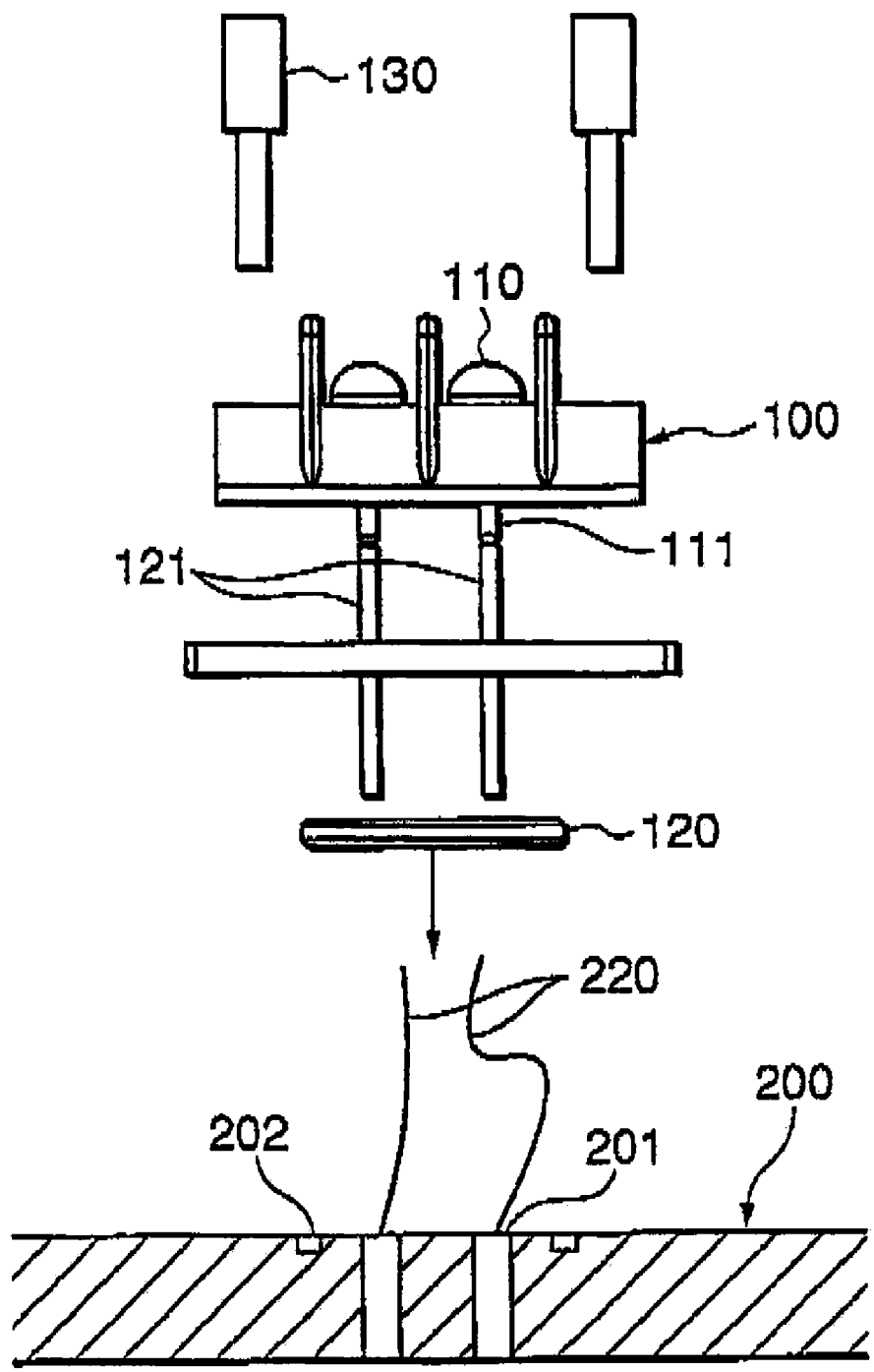
FIG. 3 is a diagram for explaining a third example of a terminal block structure in a conventional cooling-type linear motor.

As the terminal block 10, use can be made of the commercial terminal block as described with reference to FIG. 1. By the use of the commercial terminal block, it is possible to provide the waterproof terminal block unit according to this invention at a lower cost. On the other hand, the terminal block 10 may be manufactured exclusively for the present waterproof terminal block unit.

Hereinbelow, description will be made about the case of using a commercial terminal block that is provided at its upper portion with a plurality of terminals 11 for external connection and at its lower portion with a plurality of metal terminals 12 connected to the terminals 11. In this case, the main part of the terminal block 10, except the terminals 11 and the metal terminals 12, is made of a resin (e.g. a PBT resin). Lead wires 60 are connected to the metal terminals 12 for connection to coil-side lead wires (lead members) 51 brought out from a casing 50 of a linear motor.

Figure 5:
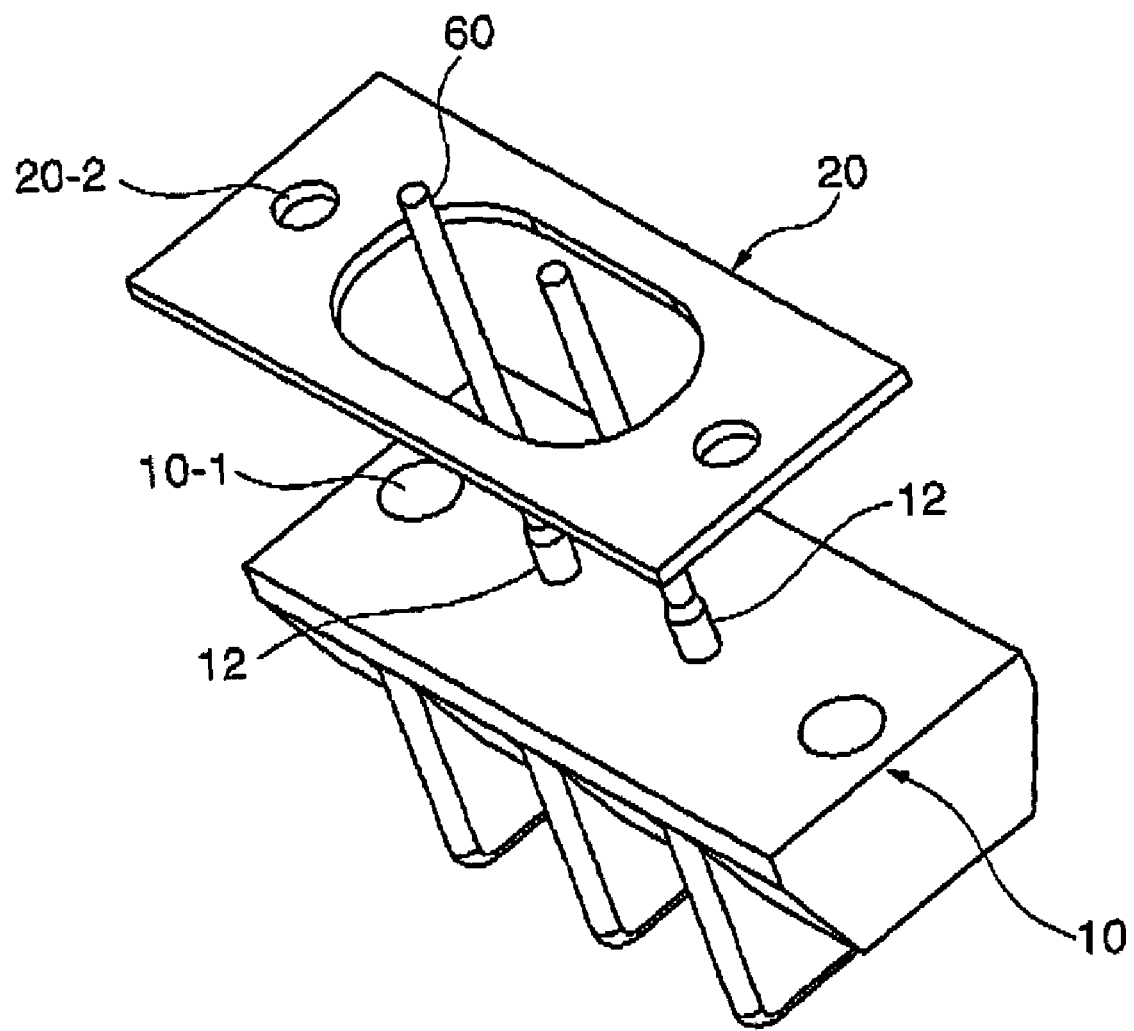
FIG. 5 is a perspective view showing a relationship between a terminal block and an insulating plate shown in FIG. 4 in a manner where top and bottom are reversed.
Figure 8:
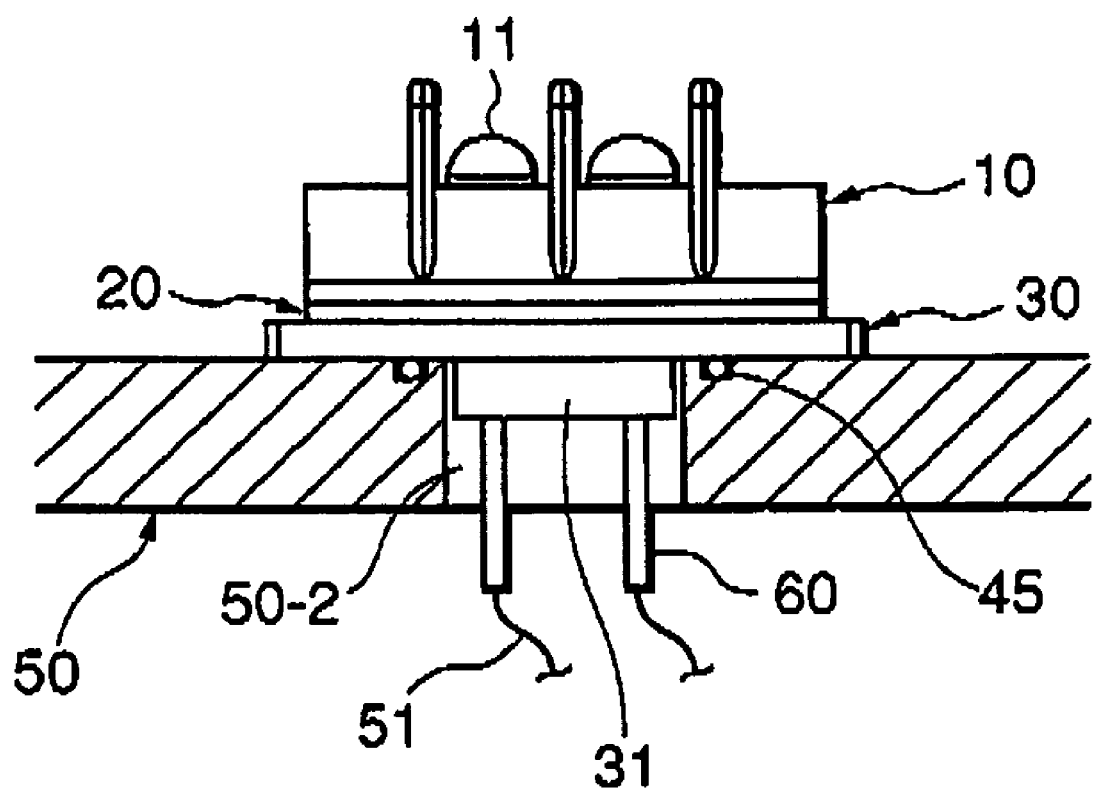
FIG. 8 is a partly sectional side view showing a structure where the waterproof terminal block unit according to the preferred embodiment of this invention is attached to the casing of the linear motor.

Referring to FIGS. 5 and 8, the insulating plate 20 is adapted to be bonded to a lower surface (one surface) of the terminal block 10 by adhesive and is formed with an elongated hole (first through-hole) 20-1 for passing therethrough the metal terminals 12 projecting from the lower surface of the terminal block 10. The elongated hole 20-1 may be a round hole. As a material of the insulating plate 20, use is made of, for example, an insulating material of engineering plastic (or super engineering plastic) such as polycarbonate, Bakelite (including cloth-inserted Bakelite), or PEEK, or an insulating material of phenol resin. These insulating materials each have a linear expansion coefficient between a linear expansion coefficient of the terminal block 10 and a linear expansion coefficient of the metal plate 30. Holes 10-1 (FIG. 5 and FIG. 6, (*a*)) are provided on both sides of the terminal block 10 for insertion therethrough of bolts 40 shown in FIG. 4. Also on both sides of the insulating plate 20, holes 20-2 are provided at positions corresponding to the holes 10-1 for inserting the bolts 40 therethrough.

Figure 6:
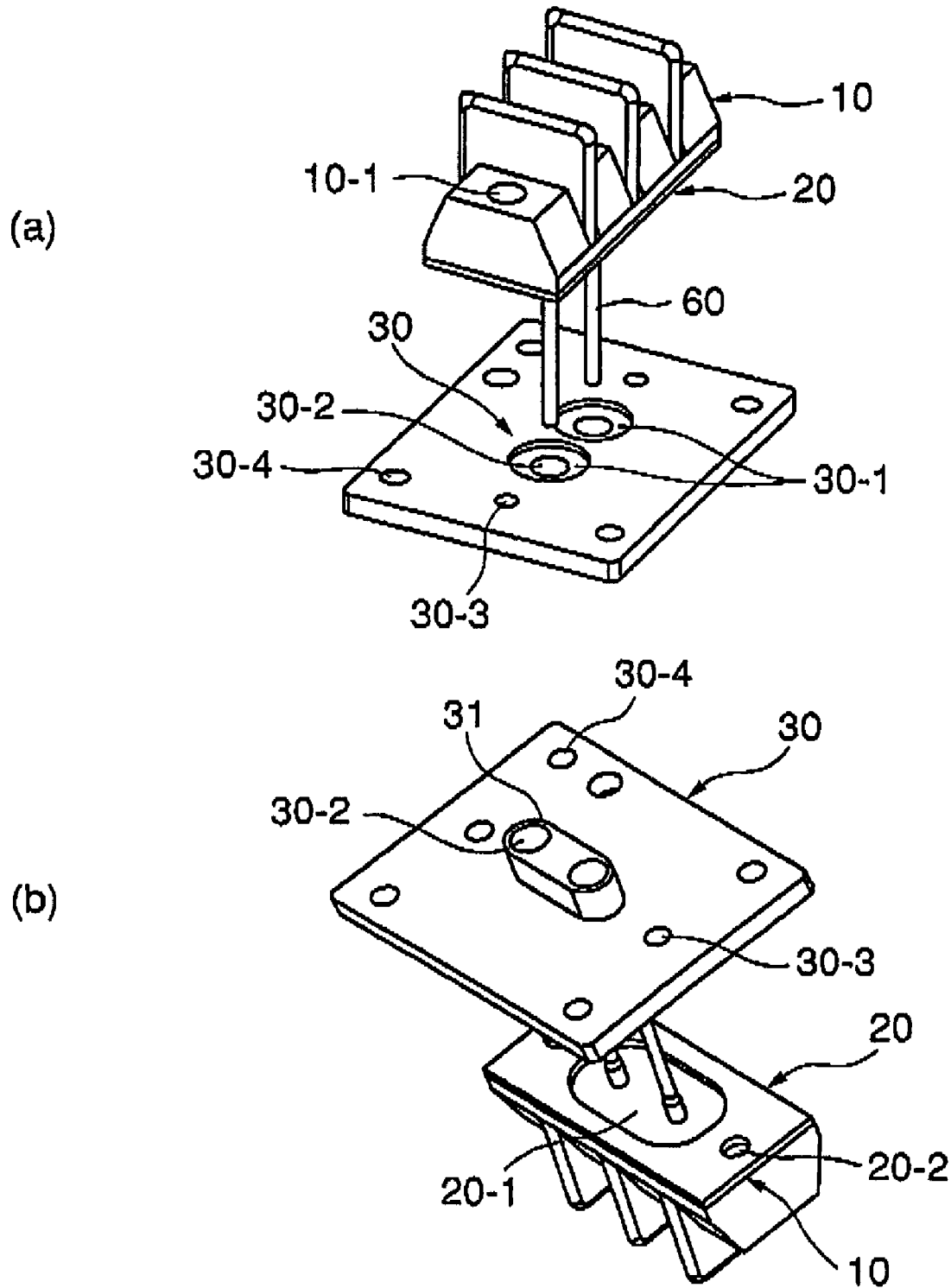
FIG. 6, (*a*) is a diagram observing, from obliquely above, a relationship between a bonded composite of the terminal block and the insulating plate shown in FIG. 4 and a metal plate to be combined therewith, and FIG. 6, (*b*) is a diagram showing the relationship between the bonded composite of the terminal block and the insulating plate shown in FIG. 4 and the metal plate to be combined therewith, in a manner where top and bottom are reversed.

Referring to FIGS. 4 and 6, (*a*), two countersunk portions 30-1 are provided on an upper side of the metal plate 30 at positions corresponding to the two metal terminals 12 projecting from the lower surface of the terminal block 10. At the center of each countersunk portion 30-1, a through-hole (second through-hole) 30-2 is formed for passing the lead wire 60 therethrough.

The metal plate 30 may be in the form of a flat plate. However, in this embodiment, as shown in FIG. 6, (b), a projecting portion 31 is provided on a lower side of the metal plate 30 at a position corresponding to a region including the two through-holes 30-2 for further improving the sealing performance. The projecting portion 31 is formed with two communication holes continuous with the two through-holes 30-2 so that the through-holes 30-2 reach a lower surface of the projecting portion 31. In FIG. 6, (b), these communication holes are assigned the same reference numeral 30-2 as the through-holes. As the metal plate 30, use is made of a material having a certain rigidity, such as, for example, stainless.

The metal plate 30 is bonded to a lower side of the insulating plate 20. This is realized by filling adhesive in the countersunk portions 30-1 and the through-holes 30-2 and applying the adhesive to the lower side of the insulating plate 20 so as to fill the adhesive also in the elongated hole 20-1. The metal plate 30 is provided with two holes 30-3 (FIG. 6, (a)) at positions corresponding to the holes 10-1 of the terminal block 10 for screwing the bolts 40 thereinto, That is, the terminal block 10, the insulating plate 20, and the metal plate 30 are bonded together by the adhesive and integrally fixed by the bolts 40. The integration of the terminal block 10, the insulating plate 20, and the metal plate 30 may be realized only by the bolts 40 without the adhesive, but it is necessary that the adhesive be filled in the elongated hole 20-1 and the through-holes 30-2.

In FIG. 4, 45 denotes an O-ring (seal ring) which is received in an annular groove 50-1 formed on the casing 50. The casing 50 is further formed with a reception hole 50-2 for receiving therein the projecting portion 31 of the metal plate 30.

Description will be made about an assembly process of the waterproof terminal block unit. As shown in FIG. 5, the lower surface of the terminal block 10 and the upper surface of the insulating plate 20, i.e. contact surfaces between the terminal block 10 and the insulating plate 20, are respectively applied, over the entirety thereof, with adhesive (e.g. epoxy-based elastic adhesive having excellent electrical insulation properties) and then bonded together. The adhesive is again applied to the hollow formed at the elongated hole 20-1 of the insulating plate 20 by bonding the two members together, thereby filling the adhesive in the hollow.

Then, as shown in FIG. 6, the lower surface of the insulating plate 20 and the upper surface (including the countersunk portions 30-1) of the metal plate 30, i.e. contact surfaces between the insulating plate 20 and the metal plate 30, are respectively applied with the adhesive and then bonded together.

Blasting such as GBB (glass bead blast) may be applied to both surfaces of the insulating plate 20 to roughen the surfaces of the insulating plate 20 so as to increase the bonding area, thereby improving the bonding strength.

Figure 7:
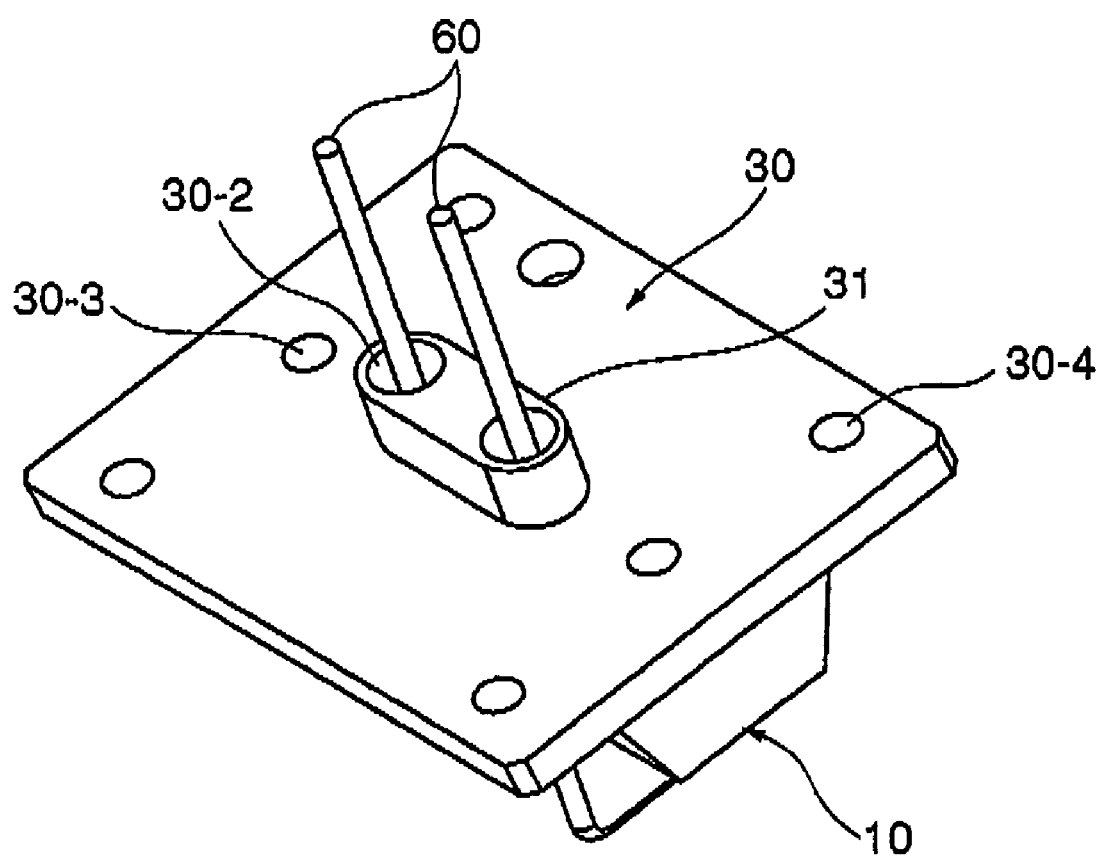
FIG. 7 is a perspective view showing the waterproof terminal block unit according to the preferred embodiment of this invention in a manner where top and bottom are reversed.

Sealing of the terminal block 10 can be sufficiently ensured only by the foregoing process, However, for ensuring more excellent sealing, as shown in FIG. 7, the adhesive is also filled into the communication holes (the holes through which the lead wires 60 from the terminal block 10 are extended out) 30-2 of the projecting portion 31 projecting from the lower surface of the metal plate 30.

Subsequently, the terminal block 10, the insulating plate 20, and the metal plate 30 are fixed together by screwing the bolts 40.

In the manner as described above, the waterproof terminal block unit is integrated. Then, the lead wires 60 from the terminal block 10 side and the lead wires 51 brought out from the casing 50 side are connected together and the connected lead wires 60 and lead wires 51 are placed into the casing 50, Thereafter, the waterproof terminal block unit is installed on the casing 50 through the O-ring 45. That is, the waterproof terminal block unit is fixed to the casing 50 by screwing non-illustrated bolts into the casing 50 through holes 30-4 provided at four corners of the metal plate 30. In the manner as described above, the terminal connection structure having the excellent sealing function is realized.

FIG. 8 is a partial sectional view showing the state where the waterproof terminal block unit is attached to the casing 50. As described above, since the waterproof terminal block unit is attached to the casing 50 by the bolts at the four corners of the metal plate 30, it can be easily detached at the time of maintenance. Although FIG. 8 shows the state where the waterproof terminal block unit is attached to the casing 50 at its upper portion, it may be attached to the casing 50 at its side portion in a sideways posture or may be attached to the casing 50 at its lower portion in an upward posture.

Figure 9:
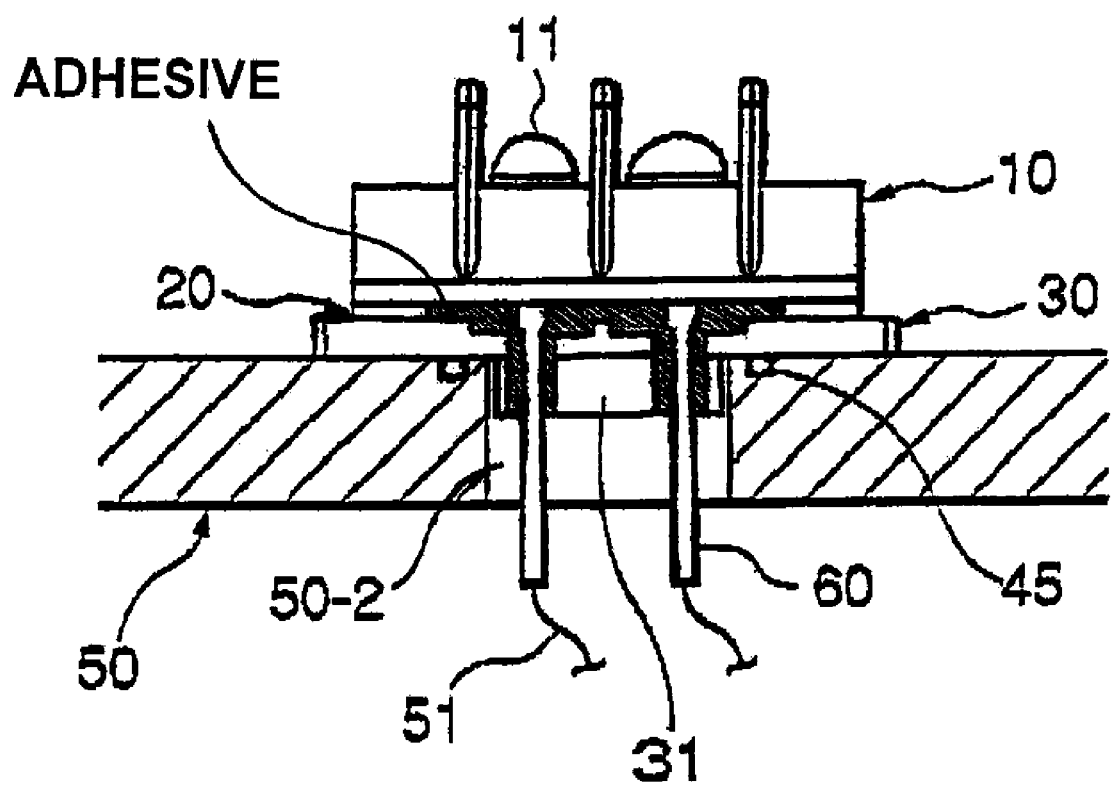
FIG. 9 is a partially sectional side view showing the structure shown in FIG. 8 including an adhesive.

FIG. 9 is a partially sectional side view showing the waterproof terminal block unit attached to the casing 50, as shown in FIG. 8, wherein the elongated hole 20-1 and the through-holes 30-2 are filled with the adhesive.

The waterproof terminal block unit according to this invention can solve the following problems as compared with the conventional terminal blocks.

1) Since the insulating plate is held between the terminal block and the metal plate, it is possible to prevent a reduction in electrical insulation between the metal portions (terminal portions) on the lower side of the terminal block and the casing or the metal plate.

2) By filling the adhesive in the elongated hole of the insulating plate and the through-holes of the metal plate, the adhesive layer between the terminal block and the casing can be thickened so that the sealing performance can be improved.

3) The projecting portion to be fitted into the casing is provided on the lower side of the metal plate and the adhesive is filled also into the through-holes of this projecting portion. Therefore, the adhesive layer can be thickened as compared with one having no projecting portion so that the sealing can be more reliable.

4) Since the terminal block is formed into the unit structure, the terminal block unit alone can be subjected to coolant leak and electrical insulation tests and can be easily replaced, and therefore, the maintenance and workability are improved.

5) Since it can be easily manufactured by. the use of the commercial terminal block, it is possible to avoid an increase in cost caused by employing the hermetic structure and a space can be minimized, thereby achieving the compact structure.

6) Between the metal plate (stainless or the like) and the terminal block (made of PBT or the like), the insulating plate of polycarbonate, PEEK, or the like having the linear expansion coefficient between the linear expansion coefficients of them is held and bonded together. Therefore, it is possible to suppress degradation of the sealing due to thermal deformation.

INDUSTRIAL APPLICABILITY

A waterproof terminal block unit according to this invention is suitable for a linear motor having a coil cooling structure. The linear motor of this type is suitable as a driving source of a positioning apparatus adapted to carry out positioning of works loaded thereon, for example, in a semiconductor manufacturing apparatus or a liquid crystal manufacturing apparatus. Particularly, the waterproof terminal block unit is optimal for the linear motor for use in an apparatus that requires strict temperature control, such as, for example, a stepper.

The invention claimed is:

1. A waterproof terminal block unit characterized by comprising:
   a terminal block having one surface provided with one or more terminals for connecting a lead member,
   an insulating plate attached to said one surface of said terminal block and having a first through-hole at a portion corresponding to a portion including said one or more terminals and its surrounding region, said first through-hole reaching from a surface contacting said one surface to an opposite surface, and
   a metal plate attached to said opposite surface of said insulating plate and having one or more second through-holes at a portion corresponding to said one or more terminals, said one or more second-through-holes reaching from a surface contacting said insulating plate to an opposite surface,
   wherein said lead member is brought out to a side of said opposite surface of said metal plate through said first and second through-holes, and
   said first and second through-holes are sealed by adhesive filled therein.

2. A waterproof terminal block unit according to claim 1, characterized in that the adhesive is also interposed between said terminal block and said insulating plate and between said insulating plate and said metal plate.

3. A waterproof terminal block unit according to claim 1, characterized in that a projecting portion is provided on the side of said opposite surface of said metal plate and has a communication hole continuous with said second through-hole, and the adhesive is also filled in said communication hole of said projecting portion.

4. A waterproof terminal block unit according to claim 2, characterized in that a projecting portion is provided on the side of said opposite surface of said metal plate and has a communication hole continuous with said second through-hole, and the adhesive is also filled in said communication hole of said projecting portion.

5. A waterproof terminal block unit according to claim 1, characterized by comprising a plurality of bolts for integrating said terminal block, said insulating plate, and said metal plate.

6. A waterproof terminal block unit according to claim 2, characterized by comprising a plurality of bolts for integrating said terminal block, said insulating plate, and said metal plate.

7. A waterproof terminal block unit according to claim 4, characterized by comprising a plurality of bolts for integrating said terminal block, said insulating plate, and said metal plate.

8. A waterproof terminal block unit according to claim 1, characterized in that a main part of said terminal block except said one or more terminals is made of a resin and said insulating plate is made of a material having a linear expansion coefficient between a linear expansion coefficient of said terminal block and a linear expansion coefficient of said metal plate.

9. A waterproof terminal block unit according to claim 2, characterized in that a main part of said terminal block except said one or more terminals is made of a resin and said insulating plate is made of a material having a linear expansion coefficient between a linear expansion coefficient of said terminal block and a linear expansion coefficient of said metal plate.

10. A waterproof terminal block unit according to claim 4, characterized in that a main part of said terminal block except said one or more terminals is made of a resin and said insulating plate is made of a material having a linear expansion coefficient between a linear expansion coefficient of said terminal block and a linear expansion coefficient of said metal plate.

11. A waterproof terminal block unit according to claim 7, characterized in that a main part of said terminal block except said one or more terminals is made of a resin and said insulating plate is made of a material having a linear expansion coefficient between a linear expansion coefficient of said terminal block and a linear expansion coefficient of said metal plate.

12. A waterproof terminal block unit according to any of claims 1 to 11, characterized in that said waterproof terminal block unit is adapted to be attached to a casing having a coil therein and configured to cool said coil by a coolant, to thereby carry out electrical connection between said coil and an external circuit outside said casing, and
   said waterproof terminal block unit is detachably attached to said casing through a sealing interposed between said opposite surface of said metal plate and said casing.

* * * * *